United States Patent [19]

VanKuiken, Jr. et al.

[11] Patent Number: 4,882,881
[45] Date of Patent: Nov. 28, 1989

[54] ROBOT POSITIONER AND SEAL ARRANGEMENT FOR A CLOSED CHAMBER

[75] Inventors: Lewis L. VanKuiken, Jr., Grand Rapids; Dale A. Hanson, Hudsonville, both of Mich.

[73] Assignee: Progressive Blasting Systems, Inc., Grand Rapids, Mich.

[21] Appl. No.: 212,658

[22] Filed: Jun. 28, 1988

Related U.S. Application Data

[63] Continuation of Ser. No. 17,537, Feb. 24, 1987, abandoned.

[51] Int. Cl.[4] .............................................. B24C 9/00
[52] U.S. Cl. ..................................... 51/426; 51/268; 118/326; 118/DIG. 7; 901/16
[58] Field of Search .................. 51/410, 417, 421, 426, 51/268, 270, 273; 118/326, 634, DIG. 7; 160/122; 901/16

[56] References Cited

U.S. PATENT DOCUMENTS

| | | | |
|---|---|---|---|
| 1,845,908 | 2/1932 | Cover | 51/268 |
| 2,822,094 | 2/1958 | Greer . | |
| 3,270,464 | 9/1966 | Bowling, Jr. et al. | 51/421 |
| 3,415,131 | 12/1968 | Zieber | 51/410 X |
| 3,527,268 | 9/1970 | Ginsburgh . | |
| 3,604,157 | 9/1971 | Fogle | 51/426 X |
| 4,125,035 | 11/1978 | Dooley . | |
| 4,205,791 | 6/1980 | Dooley . | |
| 4,229,641 | 10/1980 | Ihara . | |
| 4,311,052 | 1/1982 | Jeffras et al. . | |
| 4,493,169 | 1/1985 | Loehrer | 51/268 |
| 4,534,697 | 8/1985 | Poncet . | |
| 4,537,084 | 8/1985 | Passemard . | |
| 4,566,346 | 1/1986 | Petiteau . | |

FOREIGN PATENT DOCUMENTS

| | | | |
|---|---|---|---|
| 36869 | 5/1978 | Japan . | |
| 2120202 | 11/1983 | United Kingdom | 901/16 |

*Primary Examiner*—Robert P. Olszewski
*Attorney, Agent, or Firm*—Price, Heneveld, Cooper, DeWitt & Litton

[57] ABSTRACT

A robot positioner for a device which is positioned within a compartment having an open top and including first and second supports mounted above the compartment to move the device along "X" and "Y" coordinates. A flexible cover means associated and movable with each of the first and second supports is provided to in effect provide a movable ceiling for constantly covering the open top of the compartment regardless of the position of the device in the compartment as controlled by the supports.

24 Claims, 5 Drawing Sheets

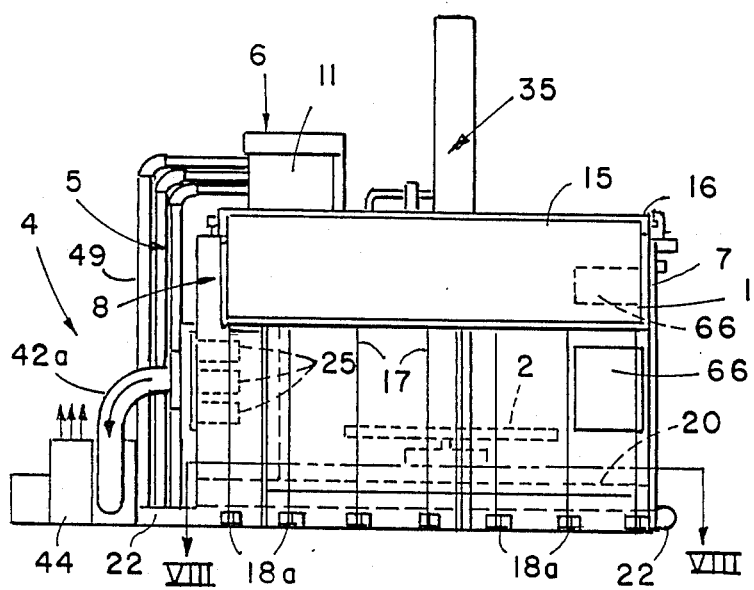
FIG. 3
FIG. 4
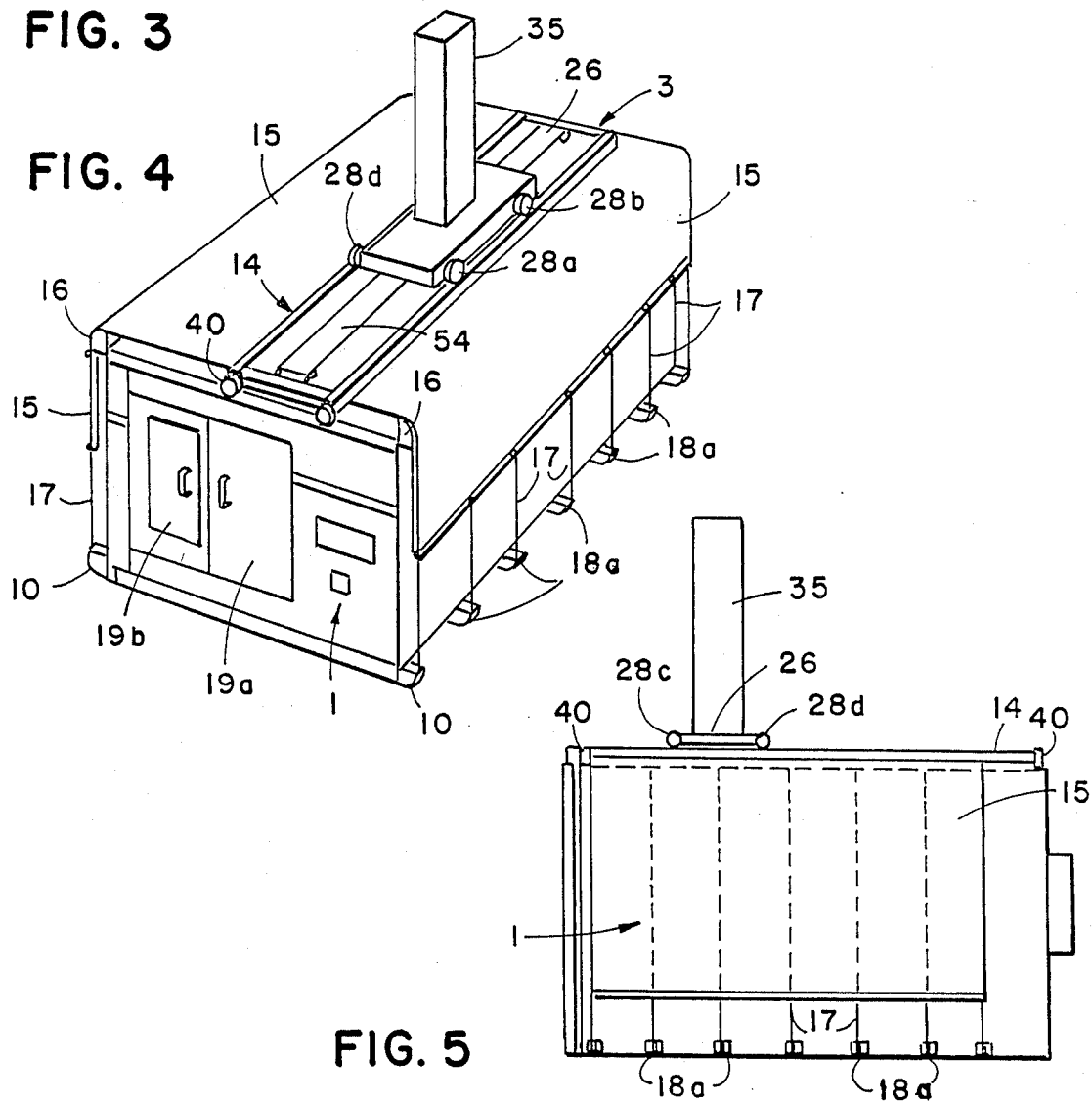
FIG. 5

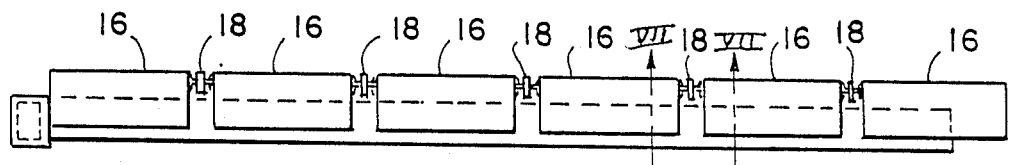
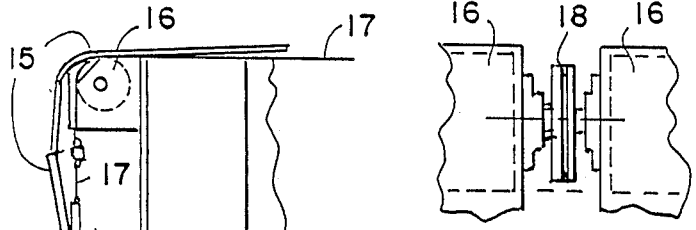
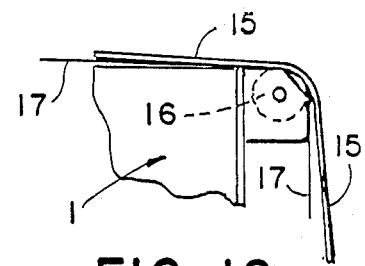
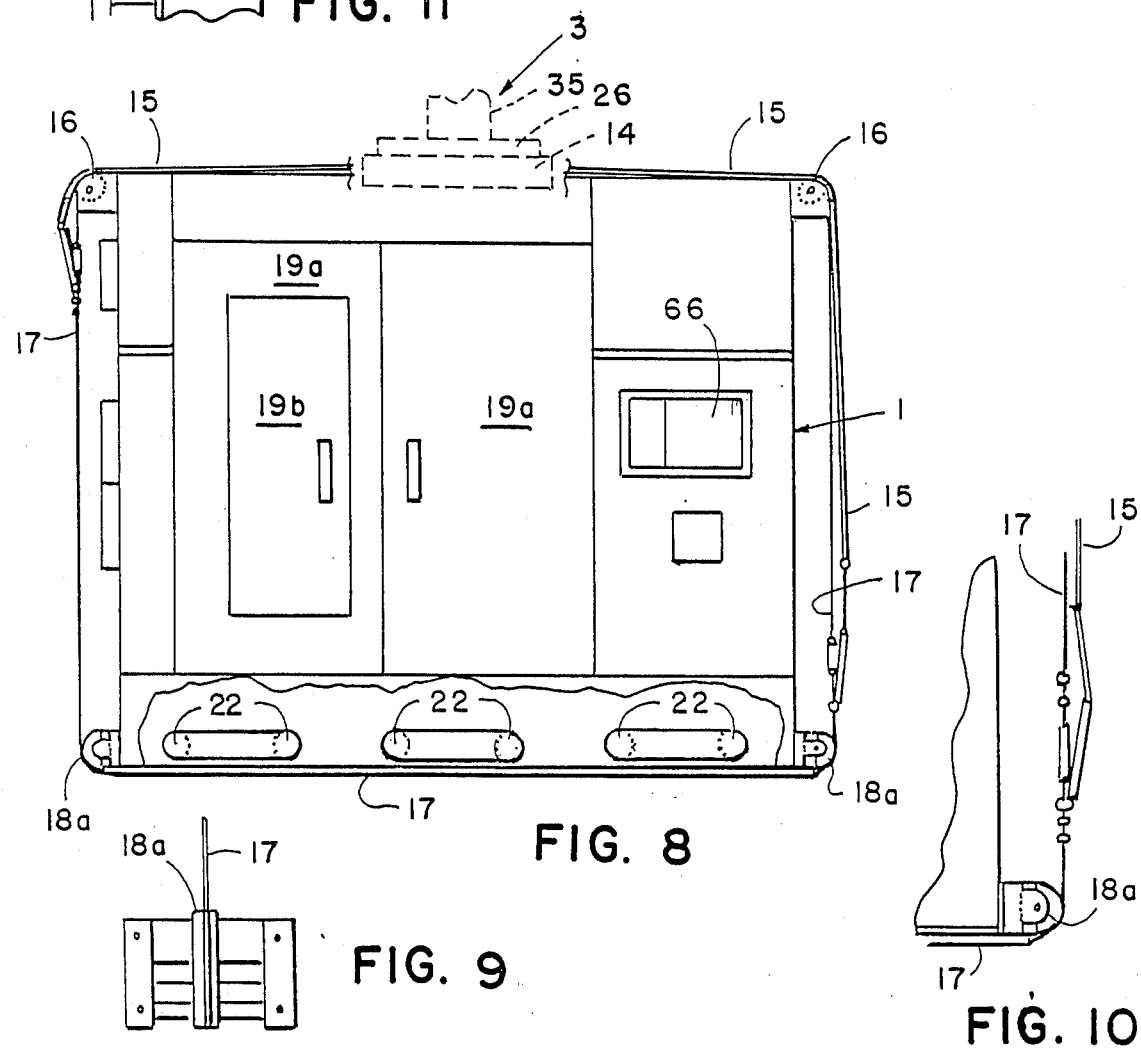
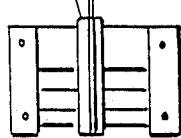

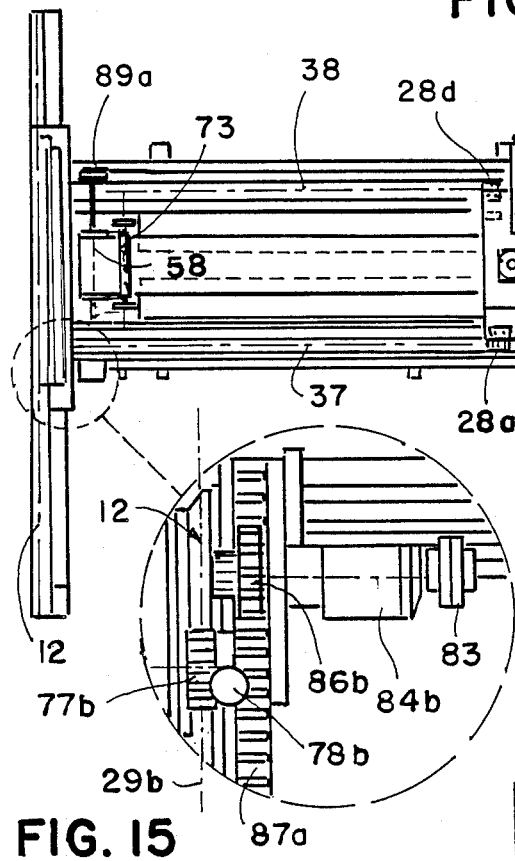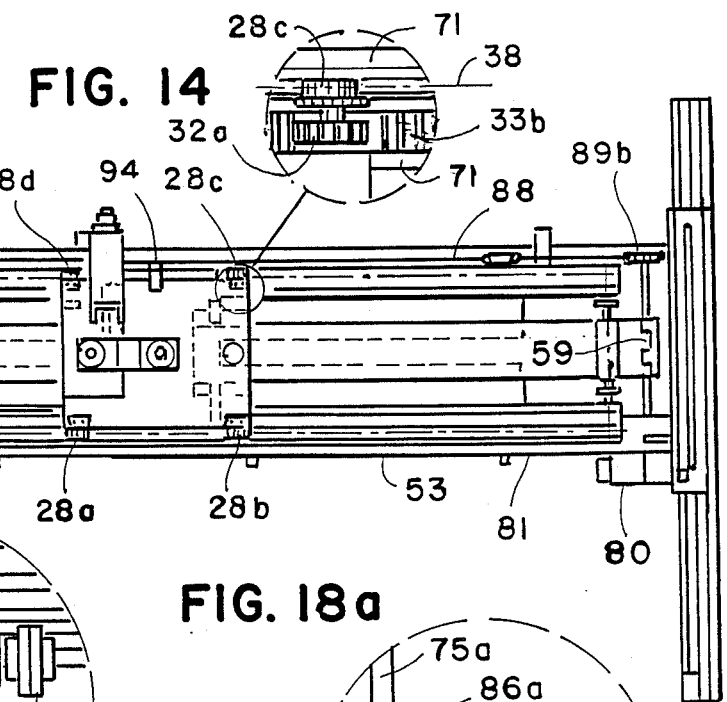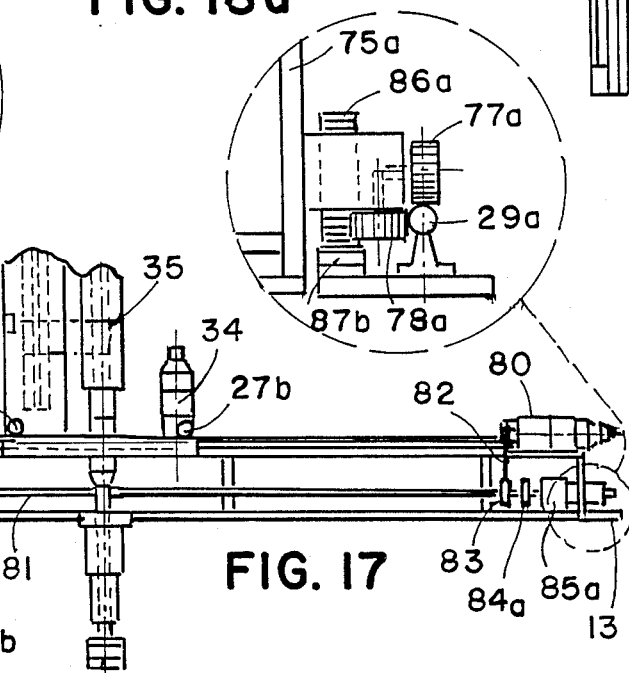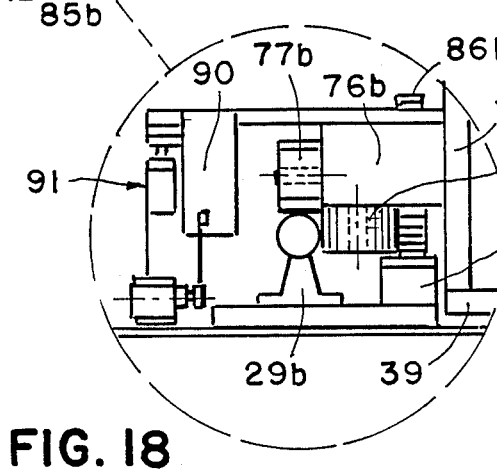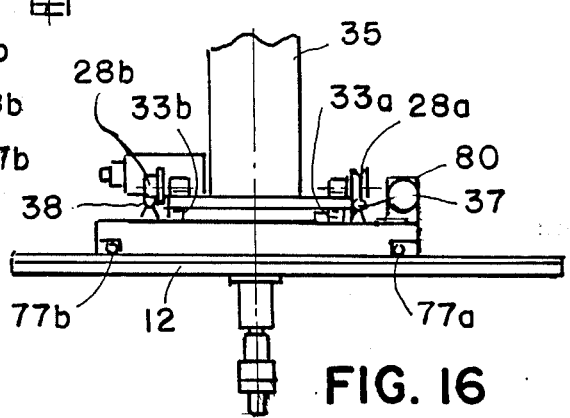

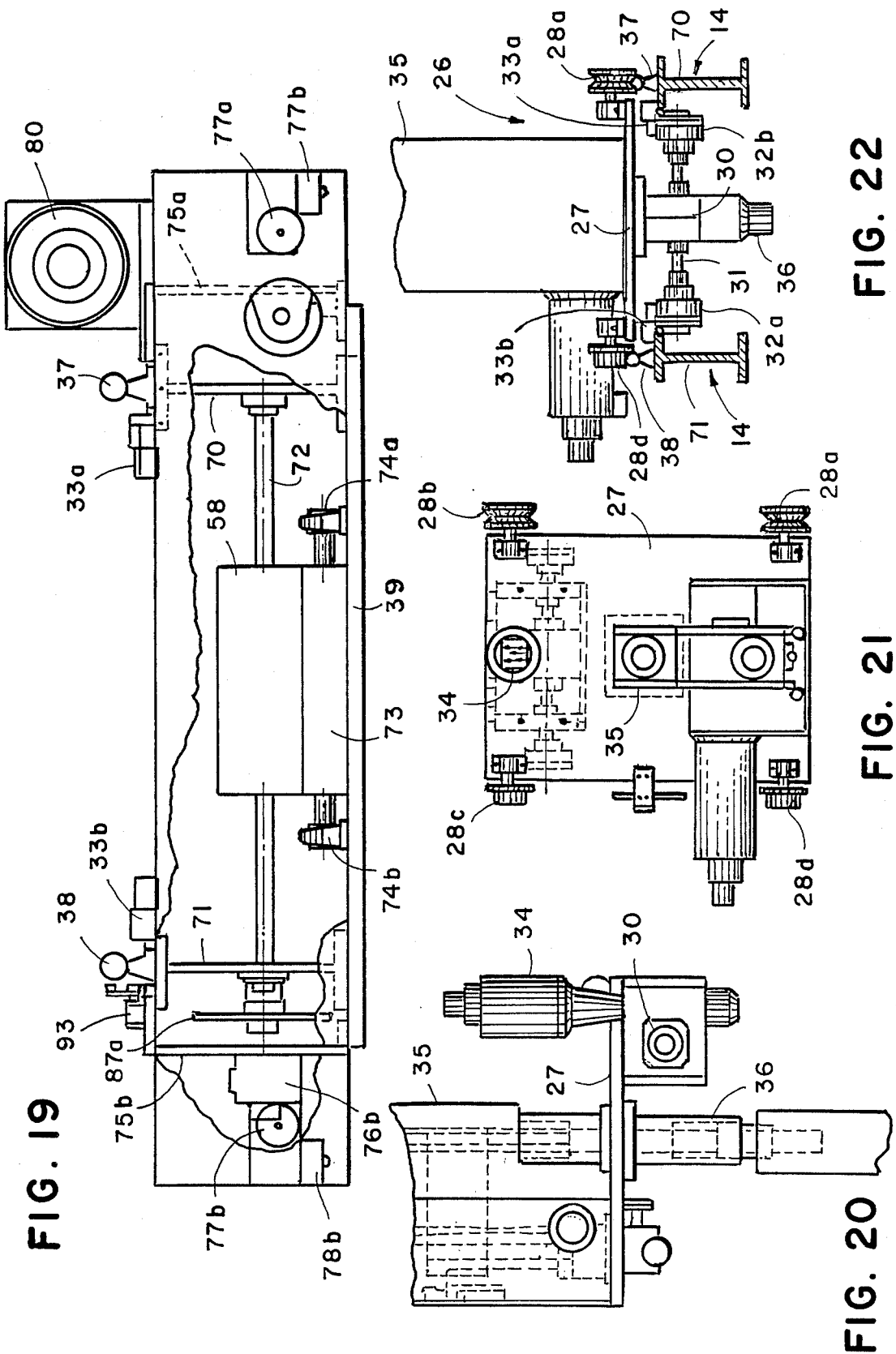

ROBOT POSITIONER AND SEAL ARRANGEMENT FOR A CLOSED CHAMBER

This is a continuation of co-pending application Ser. No. 07/017,537 filed on Feb. 24, 1987 now abandoned.

BACKGROUND OF THE INVENTION

This invention relates to apparatus for treating objects in an enclosed compartment and particularly to a robot positioner for a media blasting system of the type in which one or more workpieces are located within an enclosure and the workpiece is blasted by a media, such as silica glass, ejected by air from a blasting gun against the workpiece. This invention relates more particularly to the robot positioner and a ceiling means for retaining particles of the media within the enclosure while at the same time permitting the blasting gun to be manipulated along horizontal "X" and "Y" coordinates within the enclosure and the associated ceiling construction. This invention is applicable to any device which is to be movable within an enclosure and treat an object with a substance some of which is capable of escaping through an open top of the enclosure.

In the finishing of metallic parts, it has been a common practice to enclose the part in an enclosure in which is located a blasting gun which forces the blasting media by air against the workpiece. In this blasting operation, the force of the media striking the workpiece and the surrounding apparatus, such as the holder of the workpiece, causes some of the blasting media to break up into fine particles which are suspended in the atmosphere of the enclosure. These fine particles have a tendency to escape from the compartment in which the blasting is taking place unless the compartment is completely enclosed and sealed. Because of the dust located within the enclosure and the deleterious effect it will have on any apparatus for controlling the movement of the blasting gun, it is desirable that the means for moving the gun along the "X" and "Y" coordinates be located outside of the compartment or enclosure. The present invention relates to such a manipulator.

SUMMARY OF THE INVENTION

The present invention is directed to a compartment which is completely closed on four sides and open at the top wherein the mechanism for controlling the position of the blasting gun is located. This mechanism includes an elongated carriage assembly extending along one of the "X" or "Y" coordinates and movably supported on two opposite walls of the compartment for movement in a direction along the other of the "X" or "Y" coordinates. Mounted on the movable carriage is a cart which supports a mast extending upwardly above and downwardly into the compartment on which the blasting gun is mounted. This mast is adapted for moving the blasting gun in a vertical direction along a "Z" coordinate orthogonal to the "X" and "Y" coordinates. The cart is movable along the carriage in a direction along the one coordinate.

The unique and novel feature of this invention resides in the combination of this mechanism with covers attached thereto for covering the open top of the compartment regardless of the position of the elongated mast as it is moved by the carriage and cart assemblies along the "X" and "Y" coordinates. This is accomplished by providing a cover belt means which is attached to the sides of the carriage and extends over the opening of the compartment and along at least portions of the sides thereof so that as the carriage is moved, the open spaces between the carriage and the sides of compartment are always closed.

The carriage is provided with an elongated opening extending substantially along its entire length and through which the mast extends and is moved. The cart mounted on the carriage supports the mast for movement along the elongated opening. A second belt means is attached to the cart and extends over this elongated opening, there being release and take-up means provided at each end of the carriage for releasing and taking up the slack in this cover belt.

With the above described combination of an "X" and "Y" coordinate positioning means and cover belt means for covering the open spaces that constantly change as the position of the mast is varied, a unique and exceptionally functional robot positioner for blasting apparatus and the like is provided. Further, such apparatus can be utilized not only for blasting purposes but can be adapted for many different devices where robot positioning is desired for devices which treat an object with a substance some of which is capable of escaping from the compartment in which the treatment takes place.

BRIEF DESCRIPTION OF THE DRAWINGS

This invention and its function and operation will be further explained by the following description with reference to the drawings in which:

FIG. 3 is a side elevational view of the apparatus and equipment of FIG. 1;

FIG. 4 is a side elevational view of the apparatus and equipment of FIG. 1;

FIG. 5 is a side elevational, schematic view of the room or enclosure illustrating the relation of the cover or belt and the cables to the room or enclosure;

FIG. 6 is a detailed top elevational view of one of the belt slider assemblies mounted along one top edge of one side of the enclosure and on which the belt or cover for the enclosure slides;

FIG. 7 is a side elevational, enlarged view of the pulley assembly mounted between the slider elements of FIG. 6 and taken along the plane VII—VII of FIG. 6;

FIG. 8 is a front elevational, schematic view of the room or compartment illustrating the position of the belt or cover and the cables attached thereto;

FIG. 9 is an enlarged, partial, side elevational view of one of the cable pulley assemblies located along the bottom edges or sides of the room;

FIG. 10 is an enlarged, side elevational, detailed view of one of the lower edges of the room of FIG. 8 and illustrating the attachment at the lower edges of the cable to the belt or cover;

FIG. 11 is an enlarged, partial, cross-sectional view of one of the upper edges of the room of FIG. 8 and illustrating the attachment at that point between the cable, the cover and belt;

FIG. 12 is an enlarged, partial, cross-sectional view of the other upper edge of the room illustrating the cover or belt sliding over the slider elements of FIG. 8;

FIG. 13 is a plan view of the combination carriage assembly and cart assembly;

FIG. 14 is a plan view disclosing an enlarged portion of one corner of the cart assembly as designated on the drawing;

FIG. 15 is a plan view of an enlarged portion of a corner of the carriage assembly as designated in the drawing;

FIG. 16 is an end view of the carriage assembly and cart assembly;

FIG. 17 is a side elevational view of the carriage and cart assemblies;

FIG. 18 is an enlarged view of a portion of the carriage assembly as designated in the drawings;

FIG. 18a is an enlarged view of another portion of the carriage assembly as designated in the drawings;

FIG. 19 is an end view of the carriage assembly cut away to illustrate a number of the components thereof;

FIG. 20 is a partial, side elevational view of the robot cart assembly including a schematic illustration of the telescopic transfer device or mast for controlling the vertical and azimuth positions of the blasting gun;

FIG. 21 is a plan view of the robot cart assembly of FIG. 20; and

FIG. 22 is a partial, directional view taken along the plane XXII—XXII of FIG. 2 and disclosing the robot cart assembly and mounted on the rails and I-beams of the robot cart assembly.

BRIEF DESCRIPTION OF THE PREFERRED EMBODIMENT

Figure 1:
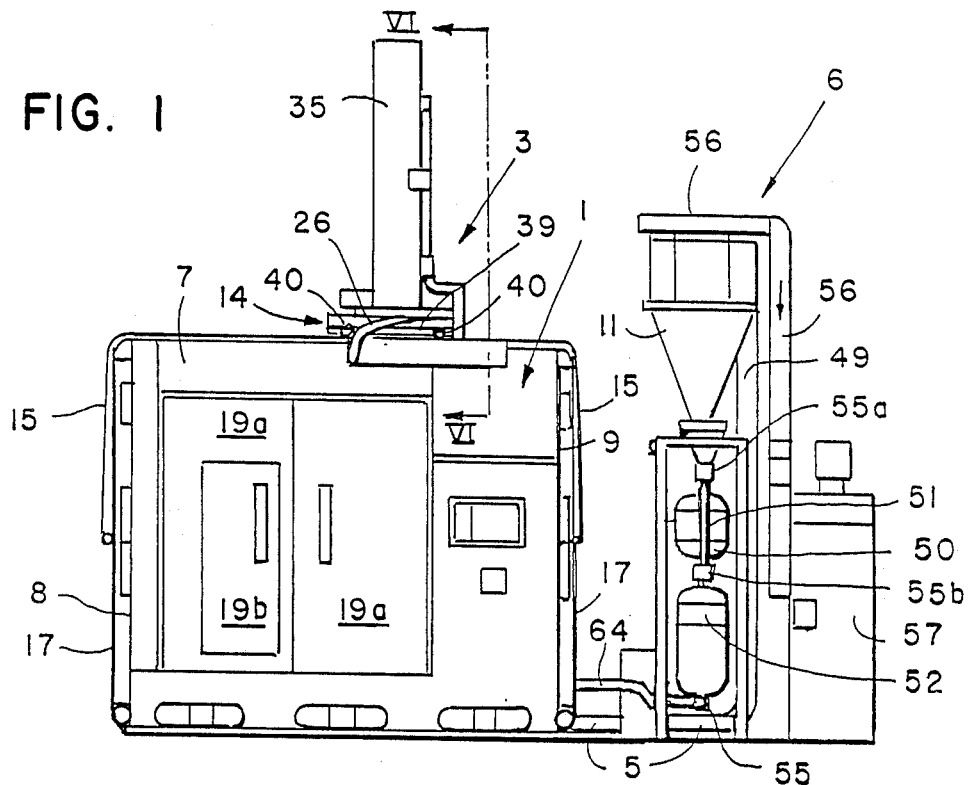
FIG. 1 is a front elevational view of a blasting system incorporating the robot positioner of this invention including the blasting room or compartment in which the blasting takes place and the manipulating apparatus located on the compartment for manipulating the blasting gun while completely enclosing the compartment.
Figure 2:
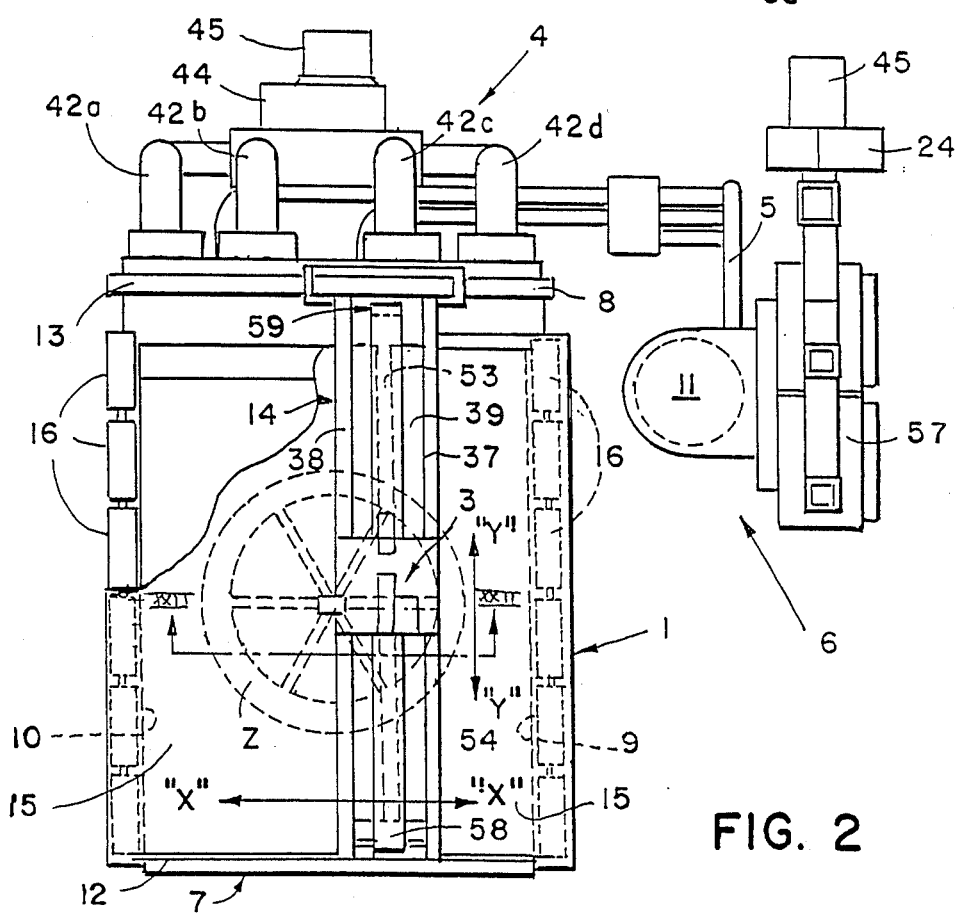
FIG. 2 is a top plan view of the apparatus and equipment of FIG. 1.

Referring to FIGS. 1, 2 and 3, reference numeral 1 designates a room assembly in which is located a workpiece holder turntable 2 (FIGS. 2 and 3) for holding workpieces to be blasted by a blasting gun (not shown). A robot assembly 3 which is a telescopic transfer device is provided for supporting and controlling the position of the blasting gun with respect to the workpieces mounted on the turntable 2. As will be explained hereinafter, the robot assembly 3 is adapted to move from the front to the rear and laterally across the room assembly along the coordinates "X" and "Y" (FIG. 2). Also, the robot assembly 3 is adapted to position the blasting gun at various heights (along coordinate "Z" of FIG. 1) and at various angles within the enclosure or room assembly 1 so that the gun can be controlled to blast the workpieces from all angles.

Extending from the rear wall of the room assembly is the vent duct assembly 4 and the reclaim ducts 5 which lead to the reclaim system assembly 6 that separates the reusable media particles from the fine unusable media particles.

The room assembly comprises the front header 7, the rear header 8 and the two side panels 9 and 10. Mounted on the front and rear headers 7 and 8 are the front and rear rail assemblies 12 and 13, respectively, which support the robot base assembly 14 for lateral movement across the top of the enclosure or room assembly 1 along the "X" coordinate. A cover or belt 15 is secured to each side of the robot base assembly and extends across the open top of the room assembly and downwardly over the sliders 16 located along the top edge of each of the side panels 9 and 10. The cables 17 are secured to the cover 15. These cables 17 ride in pulleys 18 mounted between each of the slider elements 16 and pulleys 18a located at the lower edges of the side panels 9 and 10 (FIGS. 3–12).

The room assembly includes the doors 19a for gaining access into the enclosure within the room for loading the workpieces on the turntable 2. A smaller door 19b is provided in one door 19a to permit easier access for those who are operating and maintaining the system.

An exhaust and reclaim system including a pervious floor 20 and a tubular conveying system 22 located under the floor is provided as more fully disclosed in my co-pending application Ser. No. 07/017,541, filed Feb. 24, 1987, and entitled EXHAUST AND RECLAIM SYSTEM FOR BLASTING ENCLOSURES. The pervious floor 20 is constructed of a wire mesh having openings sufficiently large for reusable media to pass therethrough. The spent media is drawn downwardly through the pervious floor and into the tubes 22 which extend from the front to the rear of the room assembly from whence they are drawn by the motorized blower 24 which draws air through the reclaim tubes 5 into the cyclone separator 11 where the usable media particles are separated from the fine unusable particles. A second exhaust source is provided by the vent duct assembly 4 which includes suction blower 44 which draws air from the enclosure through ducts 42a, 42b, 42c and 42d and the cylindrical filter elements 25 located inside and at the rear of the room assembly. These filter elements 25 are located over a portion of the perforated floor at the extreme end of the room assembly and are adapted for separating and collecting the media that is suspended in the air within the enclosure. The air inlets 66 are provided for drawing air from the outside of the room through the enclosure 1, tubes 22, and filter elements 25.

Robot Assembly

Referring more specifically to the details of the various assemblies as briefly described above, the robot assembly includes the robot carrier or base assembly 14 on which is mounted the robot cart assembly 26.

Lateral movement across the top of the enclosure or room assembly 1 is made possible by the carrier assembly 14 which is mounted on the front and rear rails 12 and 13. As broadly disclosed in FIG. 2, this carrier assembly includes two parallel rails 37 and 38 mounted on a plate 39 which by means of rollers 40 (FIGS. 1, 4 and 5) is mounted on the front and rear rail assemblies 12 and 13 for movement laterally across the top of the room assembly 1.

The plate 39 of the carrier assembly 14 has an elongated opening 53 extending substantially the entire length of the plate and through which a telescoping member 36 (FIGS. 20 and 22) of the robot mast assembly 35 (to be described hereinafter) extends and is permitted to move. In order to retain the dust formed by the blasting operation within the enclosure of the room assembly 1, a belt 54 is mounted over the elongated opening 53. Take-up means 59 (FIG. 14) are located at the ends of the plate 39 for maintaining the belt 54 taut over the opening 53. Also to retain the dust within the enclosure of room assembly 1, as previously described, the cover or belt 15 is attached to each side of the robot base assembly 14 and extends over the sliders 16 along each of the edges of the side panels 9 and 10.

FIGS. 13, 15, 16, 17, 18, 18a and 19 disclose the carriage assembly 14 in greater detail. Referring to FIG. 9, plate 39 supports "I" beams 70, 71 on the top of which are mounted the rails 37 and 38 and on the sides of which is mounted the shaft 72 for the take-up pulleys 58. The hold down pulley 73 for cover belt 54 is rotatably mounted by shaft 72 on the pillow bearing blocks 74a and 74b which are supported on plate 39. As disclosed in FIGS. 18, 18a and 19 extending upwardly from base plate 39 are the side plates 75a and 75b supporting the roller support blocks 76a and 76b, respectively, which in turn rotatably support the guide rollers 77a, 78a and 77b, 78b which ride on the rails 29a and 29b for movably supporting the carriage assembly 14 on the rails.

The carriage assembly 14 is driven by the reversible motor 80 (FIGS. 13, 17 and 19) mounted on the upper right corner of assembly 14 as viewed in FIG. 19. Motor 80 drives a drive shaft 81 through a timing belt and pulley 83 (FIG. 17). Shaft 81 is connected through couplings 84a and 84b to the gear boxes 85a and 85b the outputs of which are connected to spur gears 86a and 86b that engage gear racks 87a and 87b located adjacent rails 29a and 29b (FIG. 15). Thus rotation of spur gears 86a and 86b by motor 80 causes the carriage assembly 14 to move along rails 29a and 29b across the width of the room or compartment 1.

Also rotatably mounted on the side plate or wall 75b are sprockets 89a and 89b, one located at each end of carriage assembly 14. Sprockets 89a and 89b driven by an air motor (not shown) are connected by chain 88 to cart assembly 26 by bracket 94 for rotating take-up pulleys 58 and 59 in response to movement of cart assembly 26.

Limit switches 90 and 91 are mounted on the side of carriage assembly 14 and the support plate for rail 29b to control the actuation of motor 80 in any conventional manner well known to those skilled in the art.

Robot cart assembly 26 is more specifically disclosed in FIGS. 20, 21 and 22 and includes the support plate 27 on the corners of which are mounted the rollers or wheels 28a, 28b, 28c and 28d, which roll on the rails 37 and 38 of the carriage assembly 14. The robot cart assembly 26 is driven on the rails 37 and 38 by the motor 34 (FIGS. 20 and 21) which has a drive shaft (not shown) extending through the support plate 27 and connected to the gear reducer 30 which in turn drives the drive shaft 31 having spur gears 32a and 32b on each end thereof. These spur gears 32a and 32b engage the gear racks 33a and 33b mounted on robot base assembly 14. Actuation of the motor 34 thus rotates the drive shaft 31 and the spur gears 32a and 32b which by their engagement with the gear racks 33a and 33b causes the robot cart assembly to travel down the rails 37 and 38 of the robot base, depending upon the direction of rotation of the motor 34, all of which is controlled by a centrally located computer control circuit (not shown) and limit switches such as limit switch means 93 (FIG. 19) but which is well within the purview of anyone skilled in the art.

Extending upwardly from the support plate 27 is a robot mast assembly 35 having a downwardly extending telescoping member 36 extending through the plate 27 and on which a blasting gun is mounted. The robot mast assembly is of a conventional type positioner for positioning a tool such as disclosed in U.S. Pat. No. 4,229,641 issued to Ihara. Mast assembly 35 extends and retracts member 36 downwardly and upwardly and rotates it to control the azimuth positions of the blasting gun as determined by the mechanism within the assembly 35 and a programmed control circuit, all of which is within the purview of one skilled in the art. Thus the blasting gun is moved upwardly and downwardly and rotated with respect to the robot cart assembly 26 which in turn moves the blasting gun forwardly and rearwardly and laterally across the room so that the workpieces can be blasted from all directions.

Thus it will be evident that the robot assembly 3 is mounted for movement along the "X" and "Y" coordinates above the room assembly and by means of the robot mast assembly 35, the gun mounted on the end of the elongated support member 36 is adapted for movement along a vertical "Y" axis. Accordingly, the gun is movable for positioning at different positions on the "X", "Y" and "Z" coordinates for positioning the gun to blast the workpiece from different angles within the enclosure of the room assembly 1.

A more detailed description of the exhaust and reclaim system is set forth in our co-pending application Ser. No. 07/017,541, filed Feb. 24, 1987, and entitled EXHAUST AND RECLAIM SYSTEMS FOR BLASTING ENCLOSURES, it being understood that a broad disclosure of the exhaust and reclaim system is disclosed herein solely for the purpose of setting forth at least one environment in which the robot positioner of this invention including the means for keeping the compartment completely enclosed has utility.

OPERATION

Having described our apparatus and system for blasting and containing the blasting media within the blasting compartment, the operation of this invention should become evident. Briefly, the operation begins with the blasting gun mounted in the enclosure of the room assembly and connected to the blast hose 64 (FIG. 1) through which the blasting media is forced by compressed regulated air to the gun for blasting the workpieces mounted on the turntable support 2. The doors 19a and 19b are closed, the turntable 2 is set into operation and the robot assembly 3, which is controlled by a programmed control circuit is also put into operation. The control circuit (not shown) controls the position of the robot carriage assembly, along the "X" coordinate by controlling the operation of the drive motor 80 (FIGS. 13 and 17) which drives the spur gears 86a and 86b that engage gear racks 87a and 87b mounted on each of the front and rear rail assemblies 12 and 13. The control circuit also controls the position of the robot cart assembly 26 along the rails 37 and 38 of the robot carriage assembly 14. This is accomplished by controlling the operation of the motor 34 which in turn drives the shaft 31 on the end of which are the spur gears 32a and 32b (FIG. 22) engaging the gear racks 33a and 33b. Thus actuation of motor 34 causes the robot cart assembly 26 to travel along the rails 37 and 38 to thus control the position of the robot assembly along the "Y" coordinate as viewed in FIG. 2.

The position of the blasting gun along with the "Z" coordinate as viewed in FIG. 1 is controlled by the robot mast assembly 35 or any well-known controlled means which not only moves the blasting gun along the "Z" coordinate but also universally rotates the gun so as to position it for blasting the workpieces from all directions.

The above described movement of the robot assembly along the "X" coordinate as viewed in FIG. 2, without permitting the media to escape from compartment or room 1, is made possible by the cover or belt 15 which is secured to both edges of the plate 39 of robot carriage assembly 14 so that in effect the ceiling for the room assembly moves with the carriage assembly 14. In such movement the belt or cover 15 slides over the sliders or slider elements 16 and is assisted by the cables 17 which are also connected to the robot carriage assembly and support the belt or cover 15. The cables 17 are connected to the cover 15 and extend over the pulleys 18 between the sliders 16 and then down the side panels 9 and 10 over pulleys 18a (located at the bottom edges of panels 9 and 10) and underneath the compartment 1.

As the cart assembly is moved along the "Y" coordinate the elongated member 36 of the robot mast assembly 35 extends downwardly through the elongated opening 53 of the plate 39 and moves along this opening 53. In order to prevent dust formed within the room from escaping through the opening 53, the belt 54 is provided to always cover opening 53. The belt 54 is mounted on take-up pulley 59 at each end of the robot base assembly and these pulleys driven by an air motor (not shown) are operatively connected to robot cart assembly 26 by chain 88 extending over sprockets 89a and 89b so that the slack in the belt 54 is continually taken by means of take-up pulleys 58 and 59 up as the robot cart assembly moves along the rails 37 and 38.

While the blasting gun is blasting the workpieces supported on the turntable 2, the heavier particles of the blasting media fall downwardly and are drawn through the pervious floor 20 into the tubes 22 which are subjected to the suction forces of the suction blower 24 which is moving air through the tubular conveying system. At the same time, the suction blower 44 is drawing air through the filter elements 25. Thus the dust suspended media particles suspended in the air within the enclosure are intercepted and collected on the outer surfaces of the filter elements 25 as illustrated by FIG. 21.

Periodically the suction created by the blower 44 is interrupted and air pulses are sequentially ejected on filter elements 25 causing the media particles collected on the outer surfaces of filters 25 to be dispensed therefrom and fall and be drawn downwardly through the pervious floor 20 to the tubes 22. The dispensed media is intermixed with the heavier particles which are all then drawn through the reclaim ducts 5 and 49 upwardly into the cyclone separator 11.

The finer and lighter or unusable media particles are drawn upwardly from the cyclone 11 through the duct 56 into the dust housing 57 where the unusable, fine media particles are collected for discarding.

As described more specifically in my co-pending application Ser. No. 07/017,541, filed Feb. 24, 1987, and entitled EXHAUST AND RECLAIM SYSTEM FOR BLASTING ENCLOSURES, the heavier, usable media particles fall downwardly into the pressure pot 51 of pressure pot system 50 where they are finally introduced into the pot 52 from whence the media particles are carried by conduit 64 to the blasting gun located within the room assembly 1.

It should be evident from the above description that we have provided a robot manipulator for a blasting system having an enclosed blasting compartment in which blasting system the robot manipulator controls the positions of the blasting gun by a mechanism located essentially outside of the enclosure. This is made possible by the unique robot positioner of this invention which includes the covers associated with, the carriage and cart assemblies as described.

Having described our invention, it should be understood that although a preferred embodiment has been disclosed herein, other modifications and embodiments can be utilized without departing from the spirit of this invention. Therefore, this invention should not be limited to only the embodiment illustrated, which has been described as an example only.

The embodiments of the invention in which an exclusive property or privilege is claimed are defined as follows:

1. Apparatus for treating an object within an entirely enclosed compartment having enclosed sides and an enclosed ceiling covering the top of said compartment including an operative device manipulated by a robot manipulator means having an elongated mast extending downwardly through the ceiling of said compartment and supporting said device at its lower end for movement within said compartment and supporting said device at its lower end for movement within said compartment; said device being adapted to treat said object with a substance some of which is capable while said treatment is taking place of escaping through any opening in said compartment; the improvement comprising means for enclosing said ceiling in which said manipulator means adjusts the mast during such treatment and while it is extending through said ceiling such adjustment being in a direction along at least two horizontal orthogonal "X" and "Y" coordinates; said manipulator means comprising a carriage assembly extending in a direction along the "Y" coordinate and mounted over said top for movement in a direction along the "X" coordinate, said carriage assembly having an elongated opening extending in the direction of said "Y" coordinate and through which said mast extends; a cart assembly mounted on said carriage assembly and supporting said mast for moving said mast through and along the said opening; first motive means for causing said carriage to move in a direction along the "X" coordinate; second motive means for causing said cart assembly to move along said carriage assembly in a direction along said "Y" coordinate; a first belt cover means having first and second portions each attached respectively to and extending from each of the sides of such carriage and except for the portions occupied by said carriage assembly extending in a direction along the "X" coordinate over the open portions of the top of said compartment whereby said first belt cover means moves with said carriage in a direction along the "X" coordinate; means attached to each of the ends of said first and second portions and operatively connected together to take up the slack in one of said first and second portions while keeping said other portion taut as it moves with the carriage so as to continuously provide a ceiling for the compartment; a second belt cover means having first and second portions attached respectively to the ends of said cart assembly and extending in a direction along the said "Y" coordinate from such ends for covering the open portions of said elongated opening whereby said second cover means moves with said cart assembly in a direction along the "Y" coordinate; means attached to the ends of said first and second portions of said second belt cover means and operatively connected together to take up the slack in one of said first and second portions while keeping said other portion taut as it moves with said carriage so as to continuously cover said elongated opening whereby the open top of said compartment is completely covered by said carriage assembly, said cart assembly and said first and second cover means regardless of the position of the elongated mast as it is moved by said carriage and cart assemblies along the "X" and "Y" coordinates.

2. The apparatus of claim 1 in which the carriage assembly extends the entire distance between two opposite sides of said compartment and is supported on rails on said opposite sides.

3. The apparatus means of claim 2 in which the carriage assembly includes spaced rails between which is located said elongated opening and said cart assembly is mounted for movement on said rails.

4. The apparatus of claim 2 in which said first and second portions of said first cover means each pass over separate ones of spaced guide means located on opposite sides of said compartment, said sides extending in a direction along the said "Y" coordinate, pulley means between said guide means and at the lower edges of said opposite sides; and cables attached to the free ends of said first cover means remote from said carriage assembly, said cables extending from said cover means over said pulleys and around the bottom of said compartment.

5. The apparatus means of claim 4 in which the carriage assembly includes spaced rails between which is located said elongated opening and said cart assembly is mounted for movement on said rails.

6. The apparatus of claim 1 in which the carriage assembly includes spaced rails between which is located said elongated opening and said cart assembly is mounted for movement on said rails.

7. The apparatus of claim 1 in which the carriage assembly includes spaced rails between which is located said elongated opening and said cart assembly is mounted for movement on said rails and in which said first and second portions of said first cover means are attached to each side of said carriage assembly, said first and second portions of said first means each extend from one of the sides of said carriage assembly over a portion of the open top and down at least portions of one side of said compartment.

8. The apparatus of claim 7 in which said first and second portions of said first cover means at their free ends remote from said carriage assembly are attached to cables extending from said first cover means around the sides and bottom of said compartment.

9. The apparatus of claim 1 in which said first and second portions of said first cover means at their free ends remote from said carriage assembly are attached to cables extending from said first cover means around the sides and bottom of said compartment.

10. The apparatus means of claim 1 in which said mast is vertically adjustable for positioning said device along the "Z" coordinate orthogonal to the "X" and "Y" coordinates.

11. The apparatus of claim 1 in which said first and second portions of said first cover means each pass over guide means located on opposite sides of said compartment, said sides extending in a direction along the said "Y" coordinate.

12. The apparatus of claim 1 in which said first and second portions of said first cover means each pass over separate ones of spaced guide means located on opposite sides of said compartment, said sides extending in a direction along the "Y" coordinate, pulley means between said guide means and at the lower edges of said opposite sides; and cables attached to the free ends of said first cover means remote from said carriage assembly, said cables extending from said cover means over said pulleys and around the bottom of said compartment.

13. Apparatus for treating an object within an enclosed compartment having enclosed sides and an enclosed ceiling covering the top of said compartment including an operative device manipulated by a robot manipulator means having an elongated mast extending downwardly and upwardly through said ceiling and supporting said device at its lower end for movement within said compartment; the improvement comprising means for enclosing said ceiling in which said manipulator means adjusts the mast during such treatment and while it is extending through said ceiling such adjustment being in a direction along at least two horizontal orthogonal "X" and "Y" coordinates; said manipulator means comprising an elongated first support means extending in a direction along said "Y" coordinate and mounted on said compartment for movement in a direction along the "X" coordinate, said first support means including an elongated opening extending in a direction along said "Y" coordinate to permit movement of said mast along said "Y" coordinate; a second support means mounted on said first support means for movement along said carriage in a direction along said "Y"coordinate; and separate first and second belt cover means attached to and extending from said first and second support means for covering the top regardless of the position of the mast as it is moved by said first and second support means along the "X" and "Y" coordinates; said first belt cover means including first and second portions attached respectively to the sides of said support means and extending in opposite directions from said first support means along the "X" coordinate and movable with said first support means for continuously providing a ceiling for the compartment; means attached to each of the ends of said first and second portions and operatively connected together to take up the slack in one of said first and second portions while keeping said other portion taut as it moves with said support means and said second belt cover means having first and second portions attached respectively to the ends of said second support means and extending in opposite directions from said second support means along the "Y" coordinate and movable with said second support means along said "Y" coordinate for continuously completely covering said elongated opening; means attached to the ends of said first and second portions of said second belt cover means and operatively connected together to take up the slack in one of said first and second portions while keeping said other portion taut as it moves with said second support means.

14. The apparatus means of claim 13 in which the first support means extends the entire distance between two opposite sides of said compartment and is supported on rails on said opposite sides.

15. The apparatus means of claim 13 in which the first support means includes spaced rails between which is located said elongated opening and said second support means is mounted for movement on said rails.

16. The apparatus means of claim 14 in which the first support means includes spaced rails between which is located said elongated opening and said second support means is mounted for movement on said rails.

17. The apparatus of claim 14 in which said first and second portions of said first cover means each pass over separate ones of spaced guide means located on opposite sides of said compartment, said sides extending in a direction along the said "Y" coordinate; pulley means between said guide means and at the lower edges of said opposite side; and cables attached to the free ends of said first cover means remote from said first support means, said cables extending from said cover means over said pulleys and around the bottom of said compartment.

18. The apparatus means of claim 17 in which the first support means includes spaced rails between which is located said elongated opening and said second support means is mounted for movement on said rails.

19. The apparatus of claim 13 in which the first support means includes spaced rails between which is located said elongated opening and said second support means is mounted for movement on said rails and in which said first and second portions of said first cover means are attached to each side of said first support means respectively, said first and second portions of said first cover means each extending from one of the sides of said first support means over a portion of the open top and down a portion of one side of said compartment.

20. The apparatus of claim 19 in which said first and second portions of said first cover means at their free ends remote from said first support means are attached to cables extending from said cover means around the sides and bottom of said compartment.

21. The apparatus of claim 13 in which said first and second portions of said first cover means at their free ends remote from said first support means are attached to cables extending from said cover means around the sides and bottom of said compartment.

22. The apparatus means of claim 13 in which said mast is vertically adjustable for positioning said device along the "Z" coordinate orthogonal to the "X" and "Y" coordinates.

23. The apparatus of claim 13 in which said first and second portions of said first cover means each pass over guide means located on opposite sides of said compartment, said sides extending in a direction along the said one coordinate.

24. The apparatus of claim 13 in which said first and second portions of said first cover means each pass over separate ones of spaced guide means located on opposite sides of said compartment, said sides extending in a direction along the said "Y" coordinate; pulley means between said guide means and at the lower edges of said opposite side; and cables attached to the free ends of said first and second portions of said first cover means remote from said carriage assembly, said cables extending from said cover means over said pulleys and around the bottom of said compartment.

* * * * *

UNITED STATES PATENT AND TRADEMARK OFFICE
CERTIFICATE OF CORRECTION

PATENT NO. : 4,882,881

DATED : November 28, 1989

INVENTOR(S) : Lewis L. VanKuiken, Jr.

It is certified that error appears in the above-identified patent and that said Letters Patent is hereby corrected as shown below:

Col. 1, line 11;
    Before "system" delete "5";

Col. 1, lines 20 and 21;
    "and the associated ceiling construction" should be --while the mast of the robot manipulator extends through the ceiling--;

Col. 1, lines 41 and 42;
    After "manipulator" add --and the associated ceiling construction--;

Col. 4, line 64;
    "9" should be --19--.

Signed and Sealed this

Seventh Day of January, 1992

Attest:

HARRY F. MANBECK, JR.

*Attesting Officer*      *Commissioner of Patents and Trademarks*